United States Patent

[11] 3,611,902

| [72] | Inventor | Kiyoshi Kitai<br>Tokyo, Japan |
| --- | --- | --- |
| [21] | Appl. No. | 834,456 |
| [22] | Filed | June 18, 1969 |
| [45] | Patented | Oct. 12, 1971 |
| [73] | Assignee | Kabushiki Kaisha Hatton Tokeiten<br>Tokyo, Japan |
| [32] | Priority | June 19, 1968 |
| [33] | | Japan |
| [31] | | 43/42,167 |

[54] AUTOMATIC FLASH PHOTOGRAPHY SWITCHOVER DEVICE
4 Claims, 4 Drawing Figs.

[52] U.S. Cl. .................................................. 95/64 A
[51] Int. Cl. .................................................. G03b 9/02
[50] Field of Search ........................................ 95/10 C, 11, 64 A

[56] References Cited
UNITED STATES PATENTS

| 3,273,483 | 9/1966 | Weidner et al. | 95/64 |
| --- | --- | --- | --- |
| 3,277,805 | 10/1966 | Starp | 95/10 |
| 3,344,726 | 10/1967 | Weller | 95/64 |
| 3,352,220 | 11/1967 | Lang et al. | 95/10 |
| 3,439,595 | 4/1969 | Kiper | 95/10 |
| 3,512,463 | 5/1970 | Kiper | 95/10 |

*Primary Examiner*—Samuel S. Matthews
*Assistant Examiner*—Fred L. Braun
*Attorneys*—Robert E. Burns and Emmanuel J. Lobato

ABSTRACT: Automatic flash photography switchover device in which a camera aperture control member is controlled to take a flash exposure when the object being photographed requires flash photography. Detection of the need for a flash exposure is provided by detection circuitry and detection of readiness of the flash circuitry and detection of readiness of the flash circuitry for a flash exposure is also carried out. The aperture control for flash photography is effected only when both conditions of need for flash exposure and readiness therefor is detected, otherwise the device switches over to control the aperture for other than flash photography.

AUTOMATIC FLASH PHOTOGRAPHY SWITCHOVER DEVICE

This invention relates generally to cameras and more particularly to flash photography switchover devices.

In a camera which selects an automatic flash photographic range or another photographic range, the automatic flash photographic range must be employed only after the camera detects that the brightness of the object being photographed is lower than a predetermined level and the flash apparatus is in readiness for firing. When any one of these requirements is not satisfied, another photographic range must be employed to avoid incorrect photography.

In this invention, two members are engaged with an aperture control member which determines the aperture size in response to the set guide number or aperture setting and the adjusted distance value. One of the two members is engaged with the aperture control member when the flash apparatus is in readiness for firing and the other member is engaged with the aperture control member when a detecting apparatus detects that the brightness of the object or field being photographed is higher than a predetermined level during a detecting process. Thereby, the aperture control member prevents control of the aperture size in response to the set guide number and the adjusted distance value when one of said two members or both members are engaged with the aperture control member and allows control of the aperture size in response to the set guide number and the adjusted distance value.

Other features and advantages of the flash photography switchover device in accordance with the present invention will be better understood as described in the following specification and appended claims, in conjunction with the following drawings in which:

Figure 1:
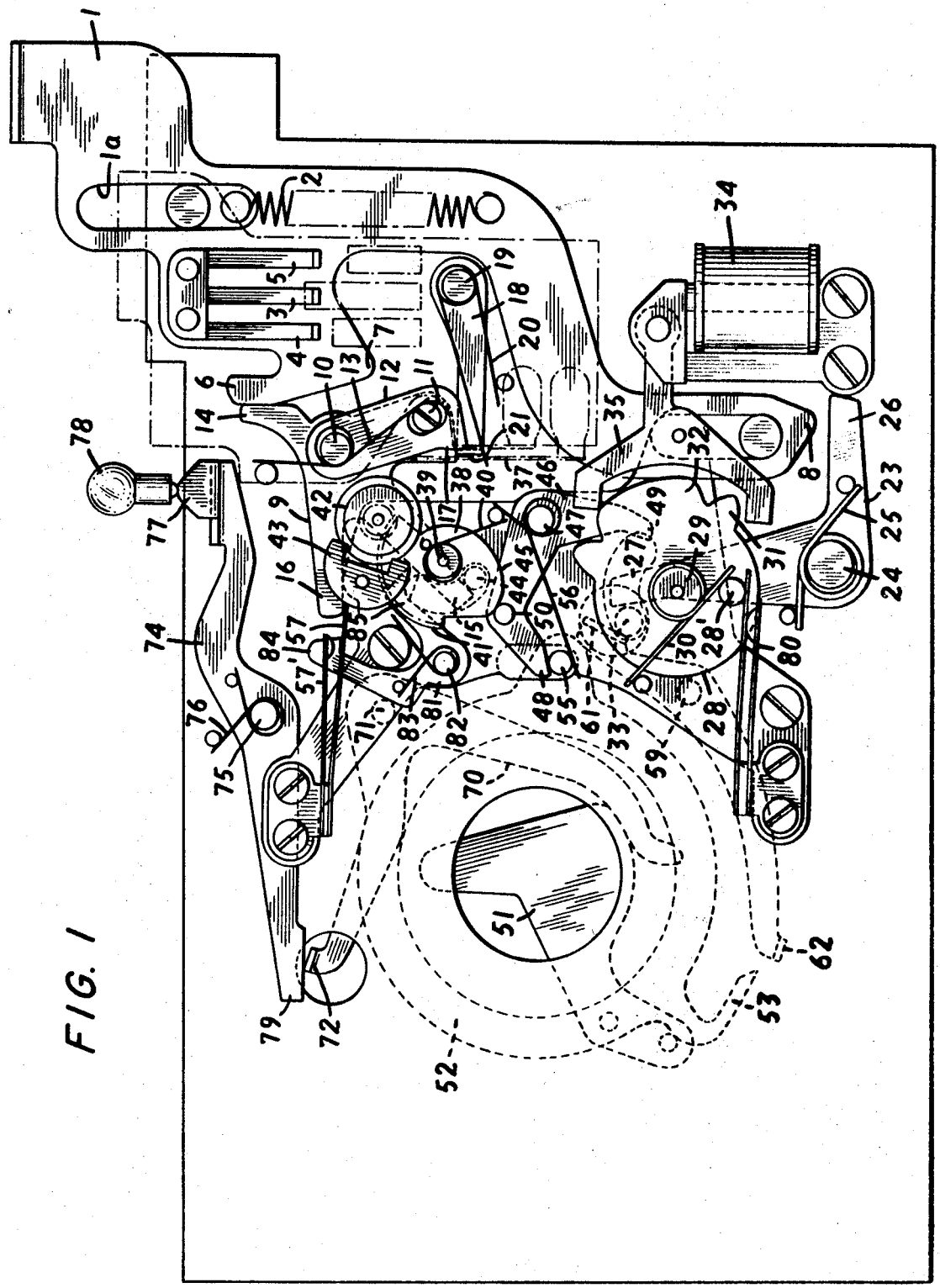
FIG. 1, is a front elevation view of a device according to the present invention.

Referring now to an embodiment of the present invention with reference to the drawings, a release lever 1 guided by a groove 1a and a pin to move upward and downward, and always biased in an upward direction by a spring 2, is provided with three electric contact members 3, 4, 5. The release lever 1 has a setting edge 6 located on one side, a release projection 7 in a middle portion thereof and an operating projection or extension 8 on a lower end. The setting edge 6 engages and disengages with a movable arm 14 of a governor setting lever 9 mounted on a shaft 10 and biased in a clockwise direction by a spring 13. The release projection 7 faces an engaging member or lever 18 pivoted on a shaft 19 and biased by a spring 20 in a clockwise direction. The projection 8 faces an arm 26 of a drive cam setting lever 23 pivotally mounted on a shaft 24 and biased in a counterclockwise direction by a spring 25. The above-described members are provided in an arrangement to operate as described hereinafter.

The governor setting lever 9 has an adjustable lever 12 pivoted on a shaft 10 and adjustably fitted on a pin 11. An engaging part 17 is provided to engage with a pawl 21 of the engaging lever 18, which engages or disengages a timing switch 37 which rests in the path of its rotation. The setting lever 9 has operating arms 15 and 16. Within the path of rotation of the arm 16 there is provided a synchro contact member 57 which is depressed by the arm 16 and which is biased to make contact with another contact 57'.

The operating arm 15 is engaged with an engaging pin 44 of a first wheel 38 mounted on a shaft 39, biased to rotate in a clockwise direction by a spring 40. A gear 41 on a first wheel 38 meshes with a gear 42 engaging with an anchor 43 to constantly control the rotation surface 45 engages with a pin 50 of a ring lever 46 pivotal on a shaft 47. One arm 48 of the ring lever 46 engages with a pin 55 of a ring 52 retaining a sector 51. The other arm is engageable with a drive pin 33 of a drive cam 28 which forms a sector-closing member mounted on a shaft 29 and biased in a clockwise direction. The drive pin 33 of the drive cam 28 is engageable with an operating arm 27 of the setting lever 23. The drive cam 28 is provided with an insulating pin 28' which operates a changeover switch 80. On the periphery of the drive cam 28 are provided a first engaging part 31 and a second engaging part 32 which engage with an anchor 35 operated by an electromagnet 34. A synchro lever 81 is mounted on a shaft 82 and is biased to rotate by a spring 83. An engaging part 84 on one end engage with the contact member 57 and the other end 85 engages with a pin 44 of the first wheel 38.

Figure 2:
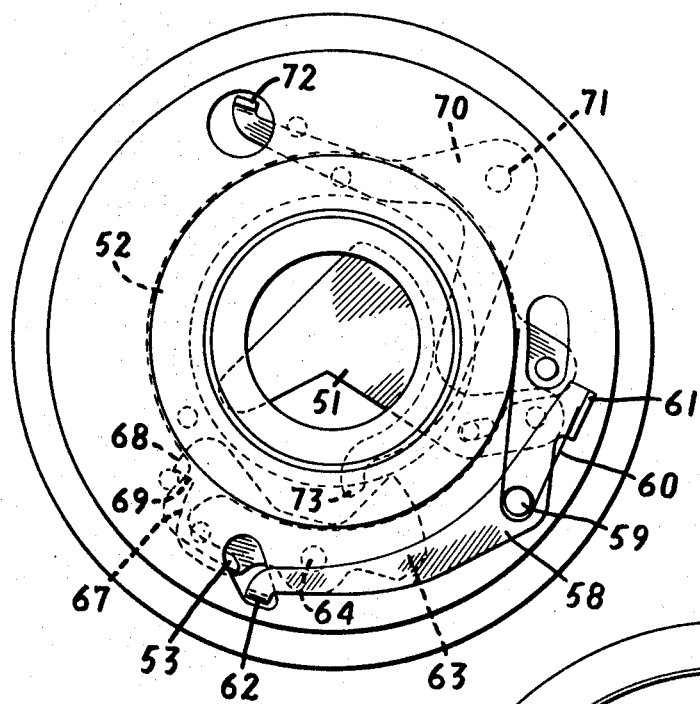
FIG. 2, is a fragmentary front elevation view of the device in FIG. 1 and illustrates diagrammatically a switching device thereof in a condition in which an object being photographed is in a dark field.
Figure 3:
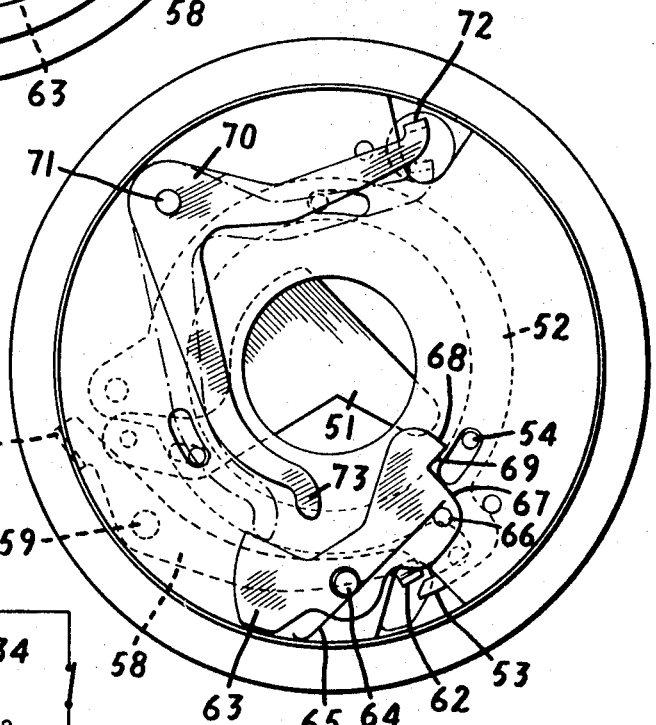
FIG. 3, is a rear elevation view of the switching device in FIG. 2 and illustrates the device in a condition in which an object being photographed is in a bright field.

A shutter ring 52 is provided with a ring pin 54 as shown in FIGs. 2 and 3. On the outer periphery of the shutter ring 52 is provided a projecting arm 53 which has an L-shape. On one end of a first changeover lever 58, biased in a clockwise direction in FIG. 2 by a spring 60, is provided an upriser 61 engageable and disengageable with and from a drive pin 33 of the drive cam 28 and on the other end an arm 53 of the shutter ring 52 and a downcomer engageable with a later described aperture control lever 63.

The aperture control lever 63, which is an aperture control member mounted on a shaft 64 and rotatable in the clockwise direction by a spring 65 (counterclockwise direction in FIG. 2) in FIG. 3, has on an arm thereof a cam surface 68 engaging with a ring pin 54 on the shutter ring 52 and an uncontrolled surface 67 not engageable with a pin 54 with a stepped portion 69 therebetween and further provided with an adjustable pin 66 displaceable by the set guide number and a adjusted photographic distance. When the downcomer 62 of the first changeover lever 58 is not restrained on the outer surface of a restraining arm 53 of the ring 52, it rotates to engage with an edge of the aperture control lever 63. A movable surface 72 on one end of a second changeover lever 70 of the V-shape is biased in a clockwise direction as in FIG. 2 by a spring, not shown. An operating portion 73 of the other arm of the second changeover lever 70 is engageable and disengageable with or from the aperture control lever 63.

Figure 4:
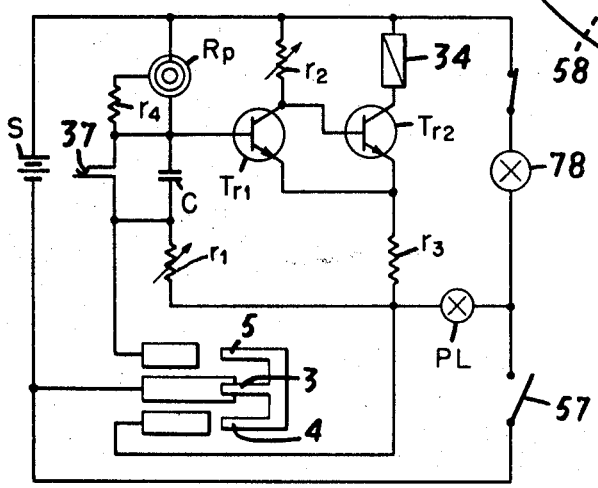
FIG. 4, is a schematic of circuitry according to the invention.

In FIG. 4, a low resistance terminal of a triode cadmium sulfide photoresistor Rp, one of whose terminals is connected to a positive terminal of a power source S, is connected through an adjustable resistance $r_4$ and a high resistance terminal directly to a condenser C, and through a comparison resistance $r_1$ and switches 3, 4 to the negative side of the power source S and through switches or contacts 3, 5 directly to the negative side of the power source S, and a timing switch 37 disposed in parallel with the condenser.

A positive terminal of the condenser C is connected to a base of a first transistor $T_{r1}$. The collector of this transistor $T_{r1}$ is connected to a negative side of the power source through a base of a second transistor $T_{r2}$, and the collector of the second transistor $T_{r2}$ is connected to a positive side of the power source S through a coil of the electromagnet 34. The emitters of the two transistors are connected to the negative side of the power source S through contacts between resistance $r_3$ and the contact members 3, 4. In parallel with these electric brightness detection circuit and electric delay circuit, there is formed a flash circuit consisting of the changeover switch 80, a flash bulb 78 and the synchro contact 57 connected in series to the power source S and in parallel with the synchro contact 57 a flash detection circuit is connected to a contact between the contact members 3 and 4 through a pilot lamp PL from the flash bulb 78.

With the construction as hereinbefore described, as the release lever 1 is depressed the first switches 3 and 4 are closed and a brightness detection circuit is established which consists of the power source S, the photoresistor Rp, a revising resistance $r_4$, a comparison resistance $r_1$. The switches 3 and 4, it will be remembered, are then in a closed condition. Now if an object being photographed has a brightness more intense than previously determined, the first transistor $T_{r1}$ is ON since the resistance Rp is lower than the comparison resistance of the photoresistor $r_1$ and the second transistor $T_{r2}$ is OFF. A current flow in the electromagnet 34 is interrupted and the anchor 35 is able to oscillate.

Depression of the release lever 1 causes the drive cam setting lever 23 to rotate in a clockwise direction, whereupon the drive pin 33 follows the operating arm 27 and turns the drive cam 28 in a clockwise direction. When the anchor 35 makes one oscillation and the first engaging part 31 moves away from the anchor 35, the release lever 1 moves down to rotate the setting lever 23 to a position of the secondary engaging part 32 which engages with the anchor 35, simultaneously the contact members 3 and 5 are closed. The comparison resistance $r_1$ is short circuited so that the first transistor $T_{r1}$ is OFF and the second transistor $T_{r2}$ is ON. A current flows in the operating coil of the electromagnet 34 and in which position or condition the second engaging part 32 engages with the anchor 35. Thus rotation of the drive cam 28 is restrained. By movement of the drive cam, the pin 28' opens a contact of the switch 80 and the drive pin 33 avoids the first changeover lever 58. The lever 58 rotates clockwise by a spring 60 and a downcomer 62 of the other arm moves into the inside of the arm 53 of the shutter ring 52 or to a position where it is not restrained. The downcomer 62 rotates the aperture control lever 63 as depicted in FIG. 3 in the counter clockwise direction and its surface 67 is rotated to a position facing the ring pin 54.

By further depression of the release lever, the contact between its setting edge 6 and the movable arm 14 of the governor setting lever 9 is interrupted. The release projection 7 contacts the engaging lever 18, rotating it in a counter clockwise direction and when the engaging part 17 of the adjustable lever 12 and an engaging pawl 21 are separated, the governor setting lever 9 starts to rotate in a clockwise direction. With the movement of the operating arm 15, the pin 44 of the first wheel 38 rotates in a clockwise direction at a speed controlled by the star wheel 42 and the anchor 43. The timing switch 37 is then opened and the capacitor C starts to charge.

Rotation of the first wheel 38 causes the ring lever 46, engaging the cam surface 45 via the pin 50, to rotate in a clockwise direction. Rotation of the operating arm 48 engages the pin 55 of the ring 52 so it rotates and the sector 51 advances its opening operation. At this time the ring pin 54 of the ring 52 rotates therewith but the control surface 68 of the aperture control lever 63 is not restrained in its rotation since it is out of the path of rotation.

During this movement the release lever 1 comes downward with its operative projection 8 completely rotating the setting lever 23. The operating arm 27 recedes entirely from the zone defined by the drive pin 33. When the condenser C is charged to a predetermined voltage, the first transistor $T_{r1}$ is ON and the second transistor $T_{r2}$ is OFF so that current flow to the electromagnet 34 is interrupted and the anchor 35 is unable to oscillate again. The second engaging part 32 of the drive cam 28 is released from engagement whereupon the cam 28 instantly is rotated in a clockwise direction by the spring 30. The drive pin 33 abuts a drive arm 49 of a ring lever 46 and rotates it in a counterclockwise direction, and the operating arm 48 turns the pin 55 of the ring to the previous position. The shutter sector instantly closes and the exposure is completed.

Provided that an object or field being photographed has a brightness lower than a predetermined level and that the release lever is initially depressed, the switches 3 and 4 are closed and a detection circuit is established whereupon since the resistance value of the CdS photoresistor Rp is higher than the resistance value of the comparison resistance $r_1$, the first transistor $T_{r1}$ is OFF, accordingly the second transistor $T_{r2}$ is ON. The electromagnet 34 attracts the anchor 35 successively so that when the setting lever 23 is rotated in a clockwise direction by the projection 8, the drive cam 28 will have its first engaging part 31 interrupted by the anchor 35 and will not start rotation. Accordingly, the upriser 61 of the first changeover lever 58 engaging with the drive pin 33 will not rotate the aperture control lever allowing the downcomer 62 of other arm to move outside the arm 53.

However, when the flash bulb 78 is not normally provided in the bulb mount 77, the flash bulb connecting rod 74 rotates in a counterclockwise direction under control of a spring 76. Therefore, the second changeover lever 72 rotates as in FIG. 2 in a counterclockwise direction. The operating part 73 rotates the aperture control lever 63 in the same FIG. in a clockwise direction. Its controlled surface 68 recedes from the path of rotation of the ring pin 54 of the ring. The uncontrolled surface 67 faces the ring pin 54 so that further depression of the release lever 1 in this position will not effect a shutter control by means of the guide number and photographic distance and exposure will be effected for a long time by electric eye photography the same as in case an object has a brightness as described, or the depression of the release lever is restrained by a known other construction. However, there is a difference in that in electric eye photography, the drive cam 28 starts from the position of the first engaging part 31 for closing the sector.

On the other hand, if the flash bulb 78 is normally provided in a bulb socket 77, the flash bulb connecting rod 74 will be in a position as shown by FIG. 1. The second changeover lever 70 will be at a position as shown by FIG. 1 and 2 so that its operating part 73 recedes from the control lever 63 which will have a position corresponding to the set guide number and adjusted photographic distance set by an adjusting pin 66. The controlled surface 68 is positioned in the path of rotation of the ring pin 54 of the ring 52. At the same time the contact between the contact members 3 and 4 will close whereby a flash apparatus detection circuit is established which consists of the power source S, flash bulb 78, and pilot lamp PL. A flash bulb is normally provided, and if a lead wire is not provided the pilot lamp PL will be lighted so that a possible operation of the flash means can be detected.

Further depression of the release lever in this condition opens contact between the contact members 3 and 5.

The electric delay circuit is in a waiting position with the electromagnet 34 energized in succession and the drive cam 28 at rest, its first engaging part 31 is restrained by the anchor 35. Upon this further depression the setting edge 6 is detached from the driven arm 14 of the governor setting lever 9 and the release projection 7 will depress and rotates the engaging lever 18 whereupon the engaging part 17 and the engaging pawl 21 will be released from engagement and the governor setting lever 9 starts to rotate in a clockwise direction. Subsequently the timing switch 37 opens and the capacitor C starts to charge. As the object is in darkness the current charged is extremely small. The engaging pin 44 of the first wheel 38 starts to rotate at a controlled speed controlled by the anchor 43. The ring 52 will rotate and the sector begins to open. The arm 53 is fitted to the inside of the upriser 62 of the first changeover lever 58 restrained in its rotation by the drive pin 33. The ring projection 54 of the ring 52 rotates until it contacts the control surface 68 of the aperture control lever 63 not affected by action of the first changeover lever 58 and restrained in the same position. The sector will have an aperture corresponding to the set guide number and adjusted photographic distance where the opening operation is stopped.

Upon termination of rotation of the first wheel 38 the engaging pin 44 rotates the synchro lever 81 in a counterclockwise direction and the contact member 57 is released from engagement of the synchro lever 81 so that the flash circuit is energized and the flash bulb is lighted. At this time a large current flows to the flash circuit so that the power source voltage instantly drops and conductance of the second transistor $T_{r2}$ is interrupted. The current in the electromagnet 34 is turned OFF and the anchor 35 is therefore able to oscillate. The drive cam 28 is released from engagement of its engaging part 31, and rotates in oscillation the anchor by means of the spring 30. Thus the restraint of the first changeover lever 58 is released from the drive pin 33. As has been described hereinbefore, the downcomer 62 of the first changeover lever 58 is restrained by an arm 53 of the ring 52 to retain its position and the first changeover lever 58 does not rotate the aperture control lever 63. The drive pin 33 abuts the driven arm 49 of the ring lever 46, rotating this lever in a counterclockwise direction. By means of the pin 55 the ring 52 is returned to its previous position. The sector 51 is closed and automatic flash exposure is accomplished.

As described hereinbefore, the present invention provides a camera or a shutter control mechanism which can automatically switch over from automatic flash photography to other photography, wherein switching to automatic flash photography is made only when the brightness of an object is lower than previously determined and the flash means is in an operative condition and an aperture adjustment is made corresponding to the set guide number and adjusted photographic distance. When either one of the above two requirements are not satisfied, another photographic operation is made by automatically not making the aperture adjustment by use of the guide number and photographic distance setting, whereby incorrect photographic operation is avoided and a safe shutter operation is assured.

What I claim and desire to secure by letters patent is:

1. An automatic flash photography switchover device for use in a camera comprising, an aperture control member for obtaining an aperture size corresponding to a photographic distance and a guide number, and means for disabling said aperture control member comprising a first movable member operative on said aperture control member when a flash circuitry in the camera is not in readiness for operation to disable same and a second movable member operative on the aperture control member only when the brightness of an object is more than a previously determined level during detection of the brightness of an object being photographed to disable same, whereby an aperture control corresponding to the set photographic distance and guide number can be obtained only when the flash circuitry is in readiness for operation and the brightness of an object is lower than the predetermined level.

2. An automatic flash photography switchover device according to claim 1, in which at least one of said first and second members associated with said aperture control member comprises means acting on said aperture control member to displace same such that an aperture set value of said aperture control member may be fixed at a maximum irrespective of the photographic distance and guide number set.

3. An automatic flash photography switchover device according to claim 1, in which at lease one of said first and second members associated with said aperture control member comprises means acting on said aperture control member when the aperture set value of said aperture control member is fixed at a maximum value, means determining the exposure aperture in a photographic exposure including an electromagnet and a delay circuit effective to interrupt current to said electromagnet in accordance with the relation of an exposure time previously programmed, and means determining the exposure aperture when both said first and second members are ineffective to act on said aperture control member for determining the action of said aperture control member comprising means restraining the opening of a sector and determining the exposure time by interruption of said current to said electromagnet due to a drop of voltage applied to said electromagnet upon firing of a flash bulb.

4. An automatic flash photography switchover device according to claim 1, including a sector-closing member, and in which said second member acting on said aperture control member in response to brightness of an object, where the brightness of an object is less than previously determined, is retained in its position not acting on a charged aperture control member by said sector-closing member and a shutter ring restraining arm during opening operation and when the brightness of an object is more than previously determined, said second member being displaced to a position to act on the aperture control member by an initial small movement of the sector-closing member and thereafter to a position not restrained by the shutter ring during subsequent opening operation.